United States Patent

Arlt et al.

[15] 3,694,708

[45] Sept. 26, 1972

[54] CONTACT ARRANGEMENT FOR EMITTER ZONE OF SEMICONDUCTOR DEVICE

[72] Inventors: Manfred Arlt, Krailling; Joachim Dathe, Munich; Helmut Guckel, Baldham, all of Germany

[73] Assignee: Siemens Aktiengesellschaft, Berlin and Munich, Germany

[22] Filed: Nov. 3, 1970

[21] Appl. No.: 86,465

[30] Foreign Application Priority Data

Nov. 6, 1969 Germany..........P 19 55 954.7

[52] U.S. Cl....317/235 R, 317/234 N, 317/235 WW, 317/235 Z

[51] Int. Cl...............................................H01l 5/00

[58] Field of Search...............................317/235, 234

[56] References Cited

UNITED STATES PATENTS 3,427,511 2/1969 Rosenzweig...............317/235

3,368,123 2/1968 Rittmann...................317/235

FOREIGN PATENTS OR APPLICATIONS 6,708,288 12/1967 Netherlands..............317/235

*Primary Examiner*—John W. Huckert
*Assistant Examiner*—E. Wojciechowicz
*Attorney*—Curt M. Avery, Arthur E. Wilfond, Herbert L. Lerner and Daniel J. Tick

[57] ABSTRACT

The emitter zone of a transistor has a p-n junction which limits the surface thereof and an edge formed by the p-n junction between the emitter and base zones. A contact arrangement comprises contact material provided on only part of the surface area of the emitter zone so that the surface area of the emitter zone in the vicinity of the emitter edge is free of contact material. Insulating material covers the surface area of the emitter zone which is free of contact material. The contact material covers at least part of the insulating material.

3 Claims, 7 Drawing Figures

CONTACT ARRANGEMENT FOR EMITTER ZONE OF SEMICONDUCTOR DEVICE

DESCRIPTION OF THE INVENTION

The invention relates to a contact arrangement for a semiconductor device. More particularly, the invention relates to a contact arrangement for the emitter zone of a semiconductor device. The semiconductor device preferably comprises a transistor having a p-n junction, located between the base electrode and the emitter electrode, which limits the surface of the emitter zone and defines the emitter edge.

In various transistor structures, non-homogeneities of the current distribution limit the capacity of the transistor. Irregular heating resulting therefrom may lead to premature thermal breakdown and result in the destruction of the transistor.

It is known that a considerable emitter length is important for high frequency power transistors. This is due to the fact that when the emitter is highly charged with specific current loads, the injection of the charge carriers becomes nonhomogenous over the emitter zone and current is conducted primarily by the emitter edge.

The active emitter zone is thus divided into a plurality of individual emitters. In order to avoid, to a considerable extent, a variable current load and to increase the reliability against a thermal breakdown, the individual emitters are connected in series with suitable ohmic resistors. A uniform current distribution over a large emitter zone is then provided via the stabilizing effect of the ohmic resistors. The aforedescribed arrangement has heretofore been utilized primarily in power transistors having a high critical frequency.

The aforedescribed arrangement is particularly expensive for low frequency, low power transistors utilized in planar technology, since it is difficult to divide the emitter zone of a transistor of the aforedescribed type into individual emitter zones and to contact each individual emitter zone separately.

The principal object of the invention is to provide a new and improved contact arrangement for the emitter zone of a semiconductor device.

An object of the invention is to provide a contact arrangement for the emitter zone of a semiconductor device which permits the current density to be distributed as uniformly as possible over the entire emitter zone.

An object of the invention is to provide a contact arrangement for the emitter zone of a semiconductor device wherein the emitter zone need not be divided into a plurality of individual emitter zones.

An object of the invention is to provide a contact arrangement for the emitter zone of a semiconductor device which considerably reduces the probability of thermal breakdown.

An object of the invention is to provide a contact arrangement for the emitter zone of a semiconductor device which functions with efficiency, effectiveness and reliability.

In accordance with the invention, only a portion of the surface of the emitter zone is provided with contact material, so that the surface area adjacent the edge of the emitter zone is free from contact material. The structure of the emitter contact of the invention insures that the base path resistance, which produces the undesired edge displacement of the emitter current, contributes toward a stable and uniform current distribution.

The areas of the surface of the emitter zone which are not coated with contact material may be covered with a layer of insulating material or insulation. The contact material may then extend over portions of the surface of the layer of insulating material.

In a rotation-symmetrical transistor geometry, the current density increases toward the edge of the emitter zone due to the voltage drop at the base path resistance below the emitter. When the diameter of the emitter zone is large, only a narrow area is effective at the edge of the emitter zone. The emitter zone could be better utilized by connecting the edge areas to the contact via a barrier resistance. The further the edge areas are from the center of the emitter zone, the greater the barrier resistance.

In an embodiment of the contact arrangement of the invention, a circular area of the surface of the emitter zone is provided with contact material in concentric relation with the circular edge of the emitter zone. The radius of the circular area is smaller than the radius of the edge of the emitter zone. The non-contacted diffused emitter zone between the area provided with contact material and the edge of the emitter zone thereby functions as a barrier resistance.

In another embodiment of the contact arrangement of the invention, the circular area of the surface of the emitter zone having the contact material thereon is surrounded by annular areas of the surface of the emitter zone, which annular areas are covered with contact material. The annular areas are on the surface of the emitter zone, so that they are located within the edge of said emitter zone. The radial widths of the annular areas on the surface of the emitter zone decrease as said annular areas move toward the edge of said emitter zone, that is, as the radial distance of the annular areas from the center of the emitter zone increases. The surface areas of the emitter zone which are not provided with contact material are covered with a layer of insulating material or insulation. The contact material on the circular area of the surface of the emitter zone and the contact material on the annular areas of the surface of said emitter zone adhere to said surface. In this embodiment of the invention, the contact or transition resistance between the contact material or metal and the semiconductor material is utilized. The specific contact or transition resistance is established in the transistor technology. The desired resistance characteristic is therefore obtained in this embodiment of the emitter contact of the invention, wherein the contacted and non-contacted areas of the surface of the emitter zone alternate and the contacted areas decrease the closer they are to the edge of the emitter zone.

In another embodiment of the contact arrangement of the invention, the emitter zone is of substantially finger shape, U shape, E shape, or the like, and has two or more strips extending from a head portion. The contact material is provided on the surface of the emitter zone in coherent narrow strips on strip areas of said surface in a manner whereby the contact material or metal covers, up to the vicinity of the edge of the emitter zone, a layer of insulating material on the surface of the emitter zone which is not covered with contact material. Thus, the strips of the surface of the emitter zone which are covered by the contact strips are so covered that the widest possible diffused area remains along the edge of the emitter zone, while the contact material is also provided on the layer of insulating material up to the vicinity of the edge of the emitter zone. As a result, the voltage drop is kept to a minimum along the contact material or metal, so that the principal portion of the emitter current does not flow only in the vicinity of the contact area. Furthermore, due to the narrow contact area or window, the contact or transition resistance as well as the resistance of the diffused area function as the desired barrier resistance.

The width of the coherent contact strips increases toward the free ends of said strips. Each area of the edge of the emitter zone is therefore connected to the emitter terminal via a barrier resistance of equal magnitude, since the voltage drop along a strip is balanced by the increase in the width of such strip.

The contact arrangement of the invention is preferably utilized in low frequency, low power transistors. The contact arrangement of the invention may also be utilized to advantage in other semiconductor devices or components such as, for example, thyristors, wherein a uniform current distribution in the contact area is desired.

In accordance with the invention, a contact arrangement for the emitter zone of a transistor having a p-n junction which limits the surface of the emitter zone, the emitter zone having an edge formed by the p-n junction between the emitter and base zones, comprises contact material provided on only part of the surface area of the emitter zone so that the surface area of the emitter zone in the vicinity of the emitter edge is free of contact material. Insulating material covers the surface area of the emitter zone which is free of contact material, and the contact material covers at least part of the insulating material.

The contact material may comprise aluminum.

The distance between the area of the surface of the emitter zone provided with contact material and the emitter edge is from 50 to 150 microns and is approximately 70 microns.

In one embodiment of the invention, the emitter edge is of circular configuration, the part of the surface area provided with contact material is of circular configuration and is concentric with the emitter edge, the circular part having a radius smaller than the radius of the emitter edge.

The part of the surface area provided with contact material is of circular configuration and of annular configurations surrounding the circular part and concentric with the circular part and within the emitter edge, the annular parts being spaced from each other, from the circular part and the emitter edge, the annular parts having radial widths which decrease as the distance of the annular part from the center of the circular part increases.

The insulating material covers the areas of the surface of the emitter zone which are not provided with contact material and the contact material provided for the circular part and the annular parts of the surface area of the emitter zone are part of a unitary body of contact material. The insulating material covers the areas of the surface of the emitter zone between the circular part and the next-adjacent annular part and between the annular parts and the insulating material between the parts is covered with contact material.

In another embodiment of the invention, the emitter edge is of finger-shaped configuration having spaced strips and the part of the surface area provided with contact material is of spaced strip configuration joined at a level portion, the contact material covering the layer of insulating material up to the vicinity of the emitter edge. Each strip part of the surface area of the emitter zone is of narrow width and increases in width toward its free end.

In order that the invention may be readily carried into effect, it will now be described with reference to the accompanying drawing, wherein.

In the FIGS., the same components are identified by the same reference numerals.

In FIGS. 1, 3, 5 and 7, the contacts are shown cross-hatched in order to enhance the clarity of illustration.

Figure 1:
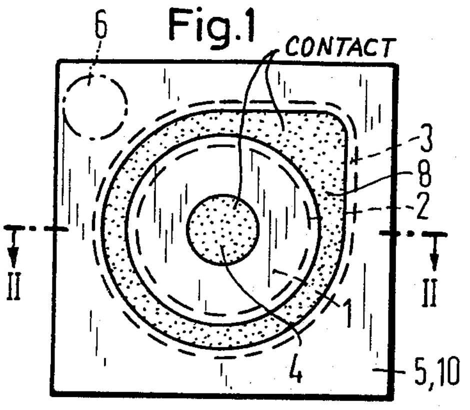
FIG. 1 is a top view of an embodiment of the contact arrangement of the invention.
Figure 2:
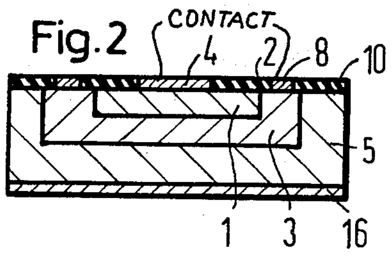
FIG. 2 is a sectional view, taken along the lines II—II of FIG. 1.

In the embodiment of FIGS. 1 and 2, a diffused emitter zone 1 has an edge 2. The edge of the emitter zone or emitter edge 2 also represents a p-n junction which emerges at the surface of the emitter zone between a base zone 3 and the emitter zone 1. A circular contact 4, of contact material, is provided on a circular area of the emitter zone 1 concentrically with the emitter edge 2. The radius of the circular contact 4 is from 50 to 150 microns smaller than the radius of the emitter edge. The contact material of the contact 4 preferably comprises metal such as, for example, aluminum.

The base zone 3 is provided with a base contact 8. The base zone 3 is surrounded by a collector zone 5. The collector zone 5 is provided with a contact 6, shown in broken lines in FIG. 1, so that it is readily distinguished from the other contacts 4 and 8. The collector contact 6 may also be provided on the same surface of the semiconductor component as the emitter and base contacts 4 and 8. The area of the surface of the emitter zone not covered by the emitter contact 4 is covered by a layer of insulating material or insulation 10.

Figure 3:
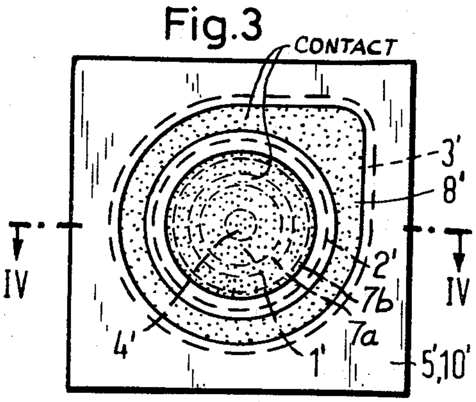
FIG. 3 is a top view of another embodiment of the contact arrangement of the invention.
Figure 4:
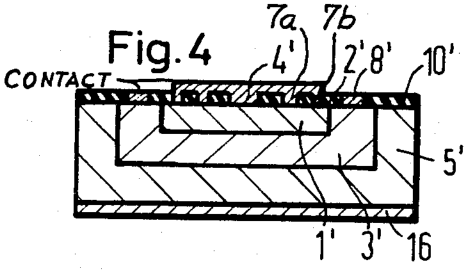
FIG. 4 is a sectional view, taken along the lines IV—IV of FIG. 3.
Figure 5:
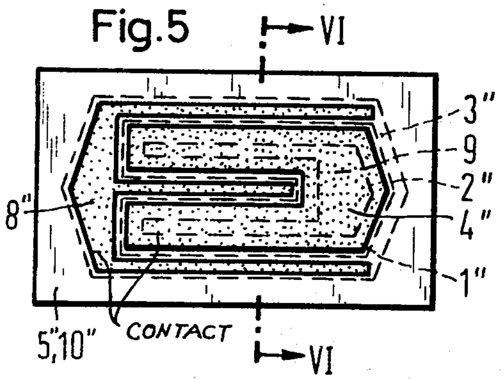
FIG. 5 is a top view of another embodiment of the contact arrangement of the invention.
Figure 6:
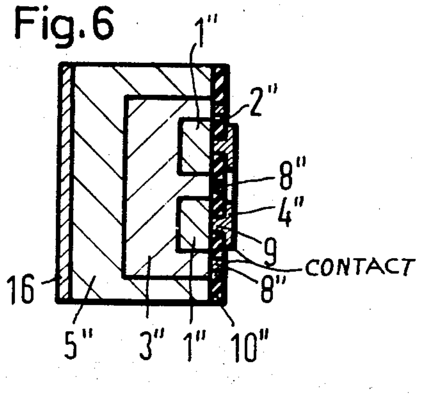
FIG. 6 is a sectional view, taken along the lines VI—VI of FIG. 5.
Figure 7:
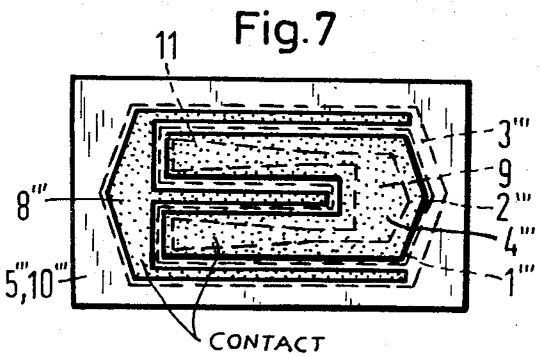
FIG. 7 is a top view of still another embodiment of the contact arrangement of the invention.

In the embodiment of FIGS. 3 and 4, the corresponding components are indicated by the same reference numerals, primed. In the embodiment of FIGS. 5 and 6, the corresponding components are indicated by the same reference numerals, double primed. In the embodiment of FIG. 7, the corresponding components are indicated by the same reference numerals, triple primed. Thus, in each of the four illustrated embodiments, the reference numeral 1 is the emitter zone; 1 being the emitter zone of the first embodiment of FIGS. 1 and 2, 1' being the emitter zone of the second embodiment of FIGS. 3 and 4, 1'' being the emitter zone of the third embodiment of FIGS. 5 and 6 and 1''' being the emitter zone of the fourth embodiment of FIG. 7.

In the embodiment of FIGS. 3 and 4, a pair of concentric annular contacts 7*a* and 7*b* surround the emitter contact 4'. The contacts 4', 7*a* and 7*b* are coaxially positioned within the emitter zone, and therefore within the emitter edge 2'. The radial width of each of the annular contacts 7*a* and 7*b* of contact material decreases as the radial distance of each annular contact from the center of the surface of the emitter zone 1' increases. It is feasible to provide a single annular contact 7*a*, for example, or a plurality of annular contacts. The circular emitter contact 4' and the annular emitter contacts 7*a* and 7*b* are integral with each other on the surface of the layer of insulating material or insulation 10'. The insulating material 10' is provided between the circular contact 4' and the next-adjacent annular contact 7*a* and between the annular contacts 7*a* and 7*b*. On the surface of the insulating material 10' the circular contact 4' and the annular contacts 7*a* and 7*b* form a unitary contact of disc-like configuration. The insulating layer 10' is not shown in FIG. 3 in order to maintain the clarity of illustration.

In a simplified modification of the embodiment of FIGS. 3 and 4, the circular contact 4' may be omitted and only a single one or more of the annular contacts may be utilized instead.

In the embodiment of FIGS. 5 and 6, an emitter contact window 9 is provided through which the contact material or metal is brought into contact with the semiconductor material of the emitter zone 1''. The contact material or metal 4'' thus covers part of the surface of the layer of insulating material 10'' up to the vicinity of the edge 2'' of the emitter zone 1''. The layer of insulating material 10'' is provided on the emitter zone 1'' outside the contact window 9.

A plurality of non-coherent emitter contact windows may be provided. The contact material or metal may then cover part of the layer of insulating material, as shown in FIG. 4, so that it is altogether coherent.

In the embodiment of FIG. 7, the emitter contact comprises strips of contact material extending from a head portion, as in the embodiment of FIGS. 5 and 6. In the embodiment of FIG. 7, however, the free ends 11 of the contact strips have a greater width than the remainder of said strips. The outer electrical connection of the emitter contact 4''' is effected at the coherent end, or head portion, of the strips. The voltage drop along the contact strips is thus compensated toward the free ends thereof.

The illustrated embodiments are preferred embodiments of the contact arrangement of the invention. The contacts may, of course, have the configuration of ellipses, rectangles, squares, and other geometrical configurations. The essential factor is to keep the areas adjacent the emitter edge free from contact material.

While the invention has been described by means of specific examples and in specific embodiments, we do not wish to be limited thereto, for obvious modifications will occur to those skilled in the art without departing from the spirit and scope of the invention.

We claim:

1. A contact arrangement for the emitter zone of a transistor having a p-n junction which limits the surface of the emitter zone, the emitter zone having an edge of circular configuration formed by the p-n junction between the emitter and base zones, said contact arrangement comprising contact material provided on only part of the surface area of the emitter zone so that the surface area of the emitter zone in the vicinity of the emitter edge is free of contact material, the part of the surface area provided with contact material being of circular configuration and of annular configurations surrounding the circular part and concentric with the circular part and within the emitter edge, the annular parts being spaced from each other, from the circular part and the emitter edge, the circular part having a radius smaller than the radius of the emitter edge, the annular parts having radial widths which decrease as the distance of the annular part from the center of the circular part increases; and insulating material covering the surface area of the emitter zone which is free of contact material, the contact material covering at least part of the insulating material.

2. A contact arrangement as claimed in claim 1, wherein the insulating material covers the areas of the surface of the emitter zone which are not provided with contact material and the contact material provided for the circular part and the annular parts of the surface area of the emitter zone are part of a unitary body of contact material.

3. A contact arrangement as claimed in claim 1, wherein the insulating material covers the areas of the surface of the emitter zone between the circular part and the next-adjacent annular part and between the annular parts and the insulating material between said parts is covered with contact material.

* * * * *